UNITED STATES PATENT OFFICE 2,218,591

VITAMIN PREPARATION

Harden F. Taylor, New York, N. Y., assignor to The Atlantic Coast Fisheries Company, New York, N. Y., a corporation of Maine No Drawing. Application October 10, 1936, Serial No. 105,086

3 Claims. (Cl. 99—11)

This invention relates to vitamin preparations and the method of making the same. More particularly, it relates to a vitamin preparation which is dry, edible and digestible and in which the vitamin is protected against oxidative deterioration which might be caused by exposure or oxidation.

Vitamin A is highly sensitive to oxidation and, when oxidized, it loses its valuable therapeutic and prophylactic properties. Vitamin C, while not oil-soluble, is characterized substantially by the same sensitivity and lability as vitamin A.

Hitherto, vitamin A, being soluble in oil and usually existing as an ingredient in natural oils, has been administered to consumers in the liquid oil in which it had its origin, or transferred to some other liquid oil, or in the form of an oily concentrate of the vitamin. These vitamin-bearing liquids were sealed in bottles under such conditions as to afford a reasonable degree of exclusion of oxygen. However, even in this instance, oxidative deterioration took place and efforts have been made to use chemicals and antoxidants as a means of inhibiting the deleterious effects of oxidation.

For numerous purposes it is and has been desirable to present the oil-soluble vitamins in a substantially dry form. Typical instances of this need are for a dry material to be compressed into tablets, with or without other medicaments, for internal medication, for incorporation with dry cereals for feeding to poultry and other animals, or for admixture with other dry preparations, such as powdered milk, chocolate, and the like. When the vitamin-bearing liquid is compounded with these dry pulverulent media, the liquid spreads as an exceedingly thin film on the surfaces of all the particles, the aggregate area of which is very great, whereby the vitamin is rendered even more susceptible to deterioration. For example, in tablet granulation, if milk sugar, chalk, magnesium carbonate, charcoal or other like powdered materials are used as dry media for absorbing oils bearing vitamin A, the vitamin is quickly destroyed. Likewise, if vitamin A is incorporated in dry cereals, such as flour, bran, shorts and the like, it also is exposed as a thin film on the surfaces of the cereal particles to the interstitial air within the mass of the cereal and is quickly oxidized, and its potency is impaired or completely destroyed.

To overcome the aforementioned difficulties, numerous efforts have been made to inhibit oxidation by means of chemical antoxidants, some of which are definitely known and recognized, such as hydroquinone and other hydroxylated and aminated ring compounds, gum guaiac and other natural substances whose active antoxidant principles are not known, such as the native constituent of cereal grains. These chemical and natural antoxidants, while partially effective inhibitors, have been found not to be permanent inhibitors of oxidation of vitamin A. Thus, at this time there still exists the need for a more perfect manner of preventing not only oxidation of the vitamin but also the prevention of rancidity of the oil as well.

One of the objects of the present invention is to overcome the above-mentioned disadvantages and provide a substantially dry, edible, digestible vitamin preparation wherein the vitamin is protected from oxidation by air or oxygen, and method of making the same.

Other objects of the invention will become apparent from the following description and appended claims.

In accordance with the principles of this invention, in one embodiment a solution of gelatin is made in warm water with a fairly high concentration, for example, 30% to 50% by weight of dry gelatin. To this solution of gelatin, while at an elevated temperature and still liquid, is added a plasticizer such as glycerin, glucose, etc. in sufficient quantity to prevent the final product from being too hard and too brittle and to impart the desired degree of softness or elasticity in the final product. This resulting warm solution of gelatin is a viscous liquid to which is added a vitamin-bearing liquid which, when stirred into the gelatin by suitable means, is broken up into fine droplets, globules or discrete particles and dispersed therein, forming an emulsion wherein the gelatin solution constitutes the continuous phase and the vitamin-bearing liquid constitutes the disperse phase.

The water in which the gelatin is dissolved is previously treated, such as by boiling, to expel the oxygen dissolved therein.

To make sure that no oxidizing substances exist in the gelatin phase, a reducing substance sufficient to reduce all such oxidizing agents may be dissolved in the latter. For this purpose, I find vitamin C, otherwise known as ascorbic or cevitamic acid, to be suitable. If vitamin C is added in excess of the amount required to reduce all oxidizing substances in the gelatin solution, then, of course, the unoxidized excess becomes a therapeutic agent itself.

The amount and potency of the oil emulsified in the gelatin solution is based on the potency and oil content desired in the finished product. It is to be understood, of course, that the quantity of oil must be low enough to be fully dispersed in the gelatin solution without becoming a continuous phase and without exuding liquid oil in the later stages of the process.

When a transparent product is desired, this can be secured by adjusting the refractive indices of the two phases to substantially identical values. For example, a suitable amount of rosin may be dissolved in the oil to bring its refractive index to substantially the same value as that of the matrix.

If desired, coloring agents may be incorporated into the emulsion so as to produce colored products and/or to exclude wave lengths of light other than excluded by the matrix. Also suitable flavoring agents may be used.

If desired, other vitamins may be incorporated in the emulsion. Thus, for example, vitamin C or vitamin C-bearing liquids may be finely suspended in the oil bearing vitamins A and D prior to the emulsification of the latter in the gelatin. By such a procedure, the finished product will contain vitamins A, C and D as discrete particles imprisoned and surrounded by the gelatin, the latter serving to protect all of these vitamins from oxidative deterioration.

Likewise, water-soluble vitamins may be incorporated in the gelatin solution prior to or subsequent to the emulsification therein of the oil bearing vitamins.

The emulsion, due to the high concentration of gelatin, is characterized in that it is a viscous liquid at an elevated temperature and upon cooling sets to form a jelly. It is to be understood that after the emulsion has set as a jelly, it must not be disturbed until substantially dry, since crushing, pulling, etc. may damage or otherwise destroy the gel structure with the release of the droplets of oil contained therein. Thereafter, it may be permitted to dry or be dried to a state substantially in equilibrium with atmospheric humidity.

When the dry product is examined by suitable microscopic means, it will be found to consist of minute droplets of the vitamin-bearing oil imprisoned in and completely surrounded by a matrix of gelatin, thereby being completely protected from access of air or oxygen and also protected from the influence of those wave lengths of light to which gelatin is opaque. The dry product is also characterized in that the surfaces thereof contain no free oil.

The gelatin-vitamin-bearing oil emulsion above described can be formed into various vitamin preparations of divers shapes and forms according to the nature and use of the preparation. It is to be understood that in order to produce the vitamin preparation constituting one phase of the invention, the emulsion must be subdivided or formed into the desired shape or form while the emulsion is in the liquid state and at the elevated temperature.

For example, the gelatin-oil-bearing emulsion prepared as above described and while in the heated state is introduced into molds of appropriate shape and size where it is allowed to set, after which it is removed and finally dried. By this procedure, preparations in globular, oval, elongated, etc. shapes may be produced. Likewise, by this procedure, hollow capsules may be produced. These hollow capsules may be filled with such medicaments as may be desired and preferably such medicaments as are incompatible with the vitamins or the oils.

In the claims the expression "consisting essentially of" is intended to cover the essential ingredients constituting the matrix. It is to be understood that this expression does not preclude the use of modifying ingredients, such as plasticizers, anti-oxidants, etc., in the matrix.

Since it is obvious that various changes and modifications may be made in the above description without departing from the nature or spirit thereof, this invention is not restricted thereto except as set forth in the appended claims.

I claim:

1. A dry vitamin preparation comprising a molded, solid product consisting essentially of a gelatin matrix containing discrete particles of a vitamin-bearing liquid dispersed therein and completely imprisoned and surrounded thereby, whereby no free vitamin-bearing liquid is on the exterior surfaces of said molded product, said vitamin-bearing liquid containing at least vitamin A.

2. A dry vitamin preparation comprising a molded, solid product consisting essentially of a plasticized gelatin matrix containing discrete particles of a vitamin-bearing liquid dispersed therein and completely imprisoned and surrounded thereby, whereby no free vitamin-bearing liquid is on the exterior surfaces of said molded product, said vitamin-bearing liquid containing at least vitamin A.

3. A dry vitamin preparation comprising a molded, solid product consisting essentially of a gelatin matrix plasticized with glycerin and containing discrete particles of a vitamin-bearing liquid dispersed therein and completely imprisoned and surrounded thereby, whereby no free vitamin-bearing liquid is on the exterior surfaces of said molded product, said vitamin-bearing liquid containing at least vitamin A.

HARDEN F. TAYLOR.